US009299008B2

(12) United States Patent
Huang et al.

(10) Patent No.: US 9,299,008 B2
(45) Date of Patent: Mar. 29, 2016

(54) UNSUPERVISED ADAPTATION METHOD AND AUTOMATIC IMAGE CLASSIFICATION METHOD APPLYING THE SAME

(71) Applicant: INDUSTRIAL TECHNOLOGY RESEARCH INSTITUTE, Chutung, Hsinchu (TW)

(72) Inventors: Tai-Hui Huang, Xiluo Township, Yunlin County (TW); Ming-Yu Shih, Gueishan Township, Taoyuan County (TW)

(73) Assignee: INDUSTRIAL TECHNOLOGY RESEARCH INSTITUTE, Chutung, Hsinchu (TW)

(*) Notice: Subject to any disclaimer, the term of this patent is extended or adjusted under 35 U.S.C. 154(b) by 15 days.

(21) Appl. No.: 14/025,391

(22) Filed: Sep. 12, 2013

(65) Prior Publication Data

US 2014/0177949 A1 Jun. 26, 2014

(30) Foreign Application Priority Data

Dec. 26, 2012 (TW) .............................. 101150168 A

(51) Int. Cl.
*G06K 9/62* (2006.01)

(52) U.S. Cl.
CPC ................ *G06K 9/6264* (2013.01); *G06K 9/62* (2013.01); *G06K 9/6259* (2013.01)

(58) Field of Classification Search
CPC .................... G06F 17/30598; G06F 17/30247; G10L 21/0272; G06T 2207/20081; A61B 6/469; G06K 9/6267; G06K 9/6256; G06K 9/6262; G06K 9/00879; G06K 9/6255; G06K 9/00288; G06K 9/00536; G06K 9/6293; G06K 9/6226; G06K 9/624; G06K 9/3233; G01N 15/1475
USPC ......... 382/103, 128, 131, 159, 171, 180, 225, 382/226, 228, 254
See application file for complete search history.

(56) References Cited

U.S. PATENT DOCUMENTS 5,159,667 A * 10/1992 Borrey .............. G06F 17/30011
382/171
5,819,007 A * 10/1998 Elghazzawi ......... A61B 5/0452
600/515

(Continued)

FOREIGN PATENT DOCUMENTS

| CN | 101582159 | 11/2009 |
| TW | 391131 | 5/2000 |

(Continued)

OTHER PUBLICATIONS

Saenko et al., "Adapting Visual Category Models to New Domains", In Proc. ECCV, Sep. 2010, 14 pages.

(Continued)

*Primary Examiner* — Vu Le
*Assistant Examiner* — Aklilu Woldemariam
(74) *Attorney, Agent, or Firm* — Muncy, Geissler, Olds & Lowe, P.C.

(57) ABSTRACT

An automatic image classification method applying an unsupervised adaptation method is provided. A plurality of non-manually-labeled observation data are grouped into a plurality of groups. A respectively hypothesis label is set to each of the groups according to a classifier. It is determined whether each member of the observation data in each of the groups is suitable for adjusting the classifier according to the hypothesis label, and the non-manually-labeled observation data which are determined as being suitable for adjusting the classifier are set as a plurality of adaptation data. The classifier is updated according to the hypothesis label and the adaptation data. The observation data are classified according to the updated classifier.

15 Claims, 3 Drawing Sheets

(56) References Cited

U.S. PATENT DOCUMENTS

| | | | |
|---|---|---|---|
| 6,173,076 B1 * | 1/2001 | Shinoda | G10L 15/144 382/159 |
| 6,424,960 B1 | 7/2002 | Lee et al. | |
| 6,453,307 B1 * | 9/2002 | Schapire | G06K 9/6256 706/12 |
| 7,885,794 B2 | 2/2011 | Liu et al. | |
| 8,396,268 B2 * | 3/2013 | Zabair | G06K 9/00 128/922 |
| 8,731,719 B2 * | 5/2014 | Franzius | G06K 9/00201 382/154 |
| 2006/0230006 A1 * | 10/2006 | Buscema | G06N 3/0454 706/13 |
| 2008/0069437 A1 * | 3/2008 | Baker | G06K 9/6256 382/159 |
| 2009/0085772 A1 * | 4/2009 | Huang | G08G 1/14 340/932.2 |
| 2009/0303042 A1 | 12/2009 | Song et al. | |
| 2011/0082824 A1 * | 4/2011 | Allison | G06N 99/005 706/20 |
| 2012/0269436 A1 * | 10/2012 | Mensink | G06K 9/00624 382/180 |
| 2012/0284793 A1 * | 11/2012 | Steinbrecher | H04L 63/1425 726/23 |
| 2013/0132331 A1 * | 5/2013 | Kowalczyk | G06N 99/005 706/52 |
| 2013/0294646 A1 * | 11/2013 | Shaw | G06T 7/0048 382/103 |

FOREIGN PATENT DOCUMENTS

| | | |
|---|---|---|
| TW | 201118754 | 6/2011 |
| TW | 201222278 A1 | 6/2012 |
| TW | 201245666 A1 | 11/2012 |

OTHER PUBLICATIONS

Kulis et al., "What You Saw is Not What You Get: Domain Adaptation Using Asymmetric Kernel Transforms", In Proc. IEEE Conference on Computer Vision and Pattern Recognition (CVPR), 2011, pp. 1785-1792.

Zhang, et al., "Improving Object Color Categorization with Shapes", IEEE 17$^{th}$ International Conference on Image Processing, Sep. 26-29, 2010, pp. 1053-1056.

Fred, et al., "Combining Multiple Clusterings Using Evidence Accumulation", IEEE Transactions on Pattern Analysis and Machine Intelligence, 2005, pp. 835-850, vol. 27, No. 6.

Chen, "Semi-Supervised Learning via Regularized Boosting Working on Multiple Semi-Supervised Assumptions", IEEE Transactions on Pattern Analysis and Machine Intelligence, Jan. 2011, pp. 129-143, vol. 33, No. 1.

Leggetter et al., "Maximum likelihood linear regression for speaker adaptatio of continuous density hidden Markov models", Computer Speech and Language, 1995, pp. 171-185, vol. 9.

Chesta et al., "Maximum a Posteriori Linear Regression for Hidden Markov Model Adaptation", Eurospeech '99, 1999, pp. 211-214, vol. 1.

Gollan et al., "Confidence Scores for Acoustic Model Adaptation", IEEE International Conference on Acoustic, Speech and Signal Processing, Mar. 21 2008-Apr. 4 2008, pp. 4289-4292.

\* cited by examiner

UNSUPERVISED ADAPTATION METHOD AND AUTOMATIC IMAGE CLASSIFICATION METHOD APPLYING THE SAME

This application claims the benefit of Taiwan application Serial No. 101150168, filed Dec. 26, 2012, the disclosure of which is incorporated by reference herein in its entirety.

TECHNICAL FIELD

The disclosure relates to an unsupervised adaptation method and an automatic image classification method applying the same.

BACKGROUND

To maintain public order, a great number of road video systems are deployed. In the event of a public offense, investigators/police officers need to retrieve recorded data of associated location and time, and vast human resources and time are then spent to identify clues for solving the case. It is a common occurrence that much of the effort is spent in vain as the prime time for solving a case is often missed.

Therefore, computerized visual classification retrieval technologies for assisting manual search on a recording database are becoming popular. However, properties including resolutions, covered ranges and angles, and color deviations of video cameras of the deployed road video systems may be quite different. If a computerized visual classifier is incapable of automatically adapting to video data obtained from different image capturing properties, the system is unlikely to yield stable and reliable retrieval results.

To enhance classification performance of a computerized classification system under different scenes and lighting conditions, supervised adaptation algorithms and unsupervised adaptation algorithms have been proposed. In the supervised adaptation algorithms and unsupervised adaptation algorithms, parameters of a classifier are adjusted by image data collected under test environments, to adapt to image parameter distributions in the test environments.

The supervised adaptation algorithm, requiring manual labeling on image contents, has preferred performance but inadequate practicability due to high human resource costs. The unsupervised adaptation algorithm, although involving no manual labeling on image contents, suffers from possible hypothesis labeling errors. More particularly, the issue of hypothesis labeling errors can be aggravated when test environment data and training data are remarkably different, such that the unsupervised adaptation algorithm yields an even less satisfactory classification result.

A so-called semi-supervised adaptation algorithm that combines features of the two adaptive algorithms above is also available. The semi-supervised adaptation algorithm indeed offers more preferred and more stable performance, however still requires manually labeled image data when put to practice. Moreover, the semi-supervised adaptation algorithm also needs to further satisfy sample representativeness in order to correctly provide reference for non-manually-labeled image data.

SUMMARY

The disclosure is directed to a computerized visual classification method which automatically adjusts classifier parameters to adapt to different application environment conditions and to maintain stable performance. In the process of automatically adjusting the classifier parameters, manual labeling on new scene data is not required.

According to one embodiment, an unsupervised adaptation method is provided. A plurality of non-manually-labeled observation data are grouped into a plurality of groups. Each of the groups is set with a respective hypothesis label according to a classifier. According to the hypothesis label, it is determined whether each member of the observation data of the groups is suitable for adjusting the classifier, and the observation data which is determined as being suitable for adjusting the classifier are set as a plurality of adaptation data. At least one adjustment parameter of the classifier is predicted according to the hypothesis label and the adaptation data to adjust the classifier. The above steps are iterated to adjust the classifier until a predetermined condition is satisfied.

According to an alternative embodiment, an automatic image classification method is provided. A plurality of non-manually-labeled observation data are grouped into a plurality of groups. Each of the groups is set with a respective hypothesis label according to a classifier. According to the hypothesis label, it is determined whether each member of the observation data of the groups is suitable for adjusting the classifier, and the observation data which are determined as being suitable for adjusting the classifier are set as a plurality of adaptation data. At least one adjustment parameter of the classifier is predicted according to the hypothesis label and the adaptation data to adjust the classifier. The classifier is updated by iterating the above steps until a predetermined condition is satisfied. The observation data are classified according to the updated classifier.

Figure 1:
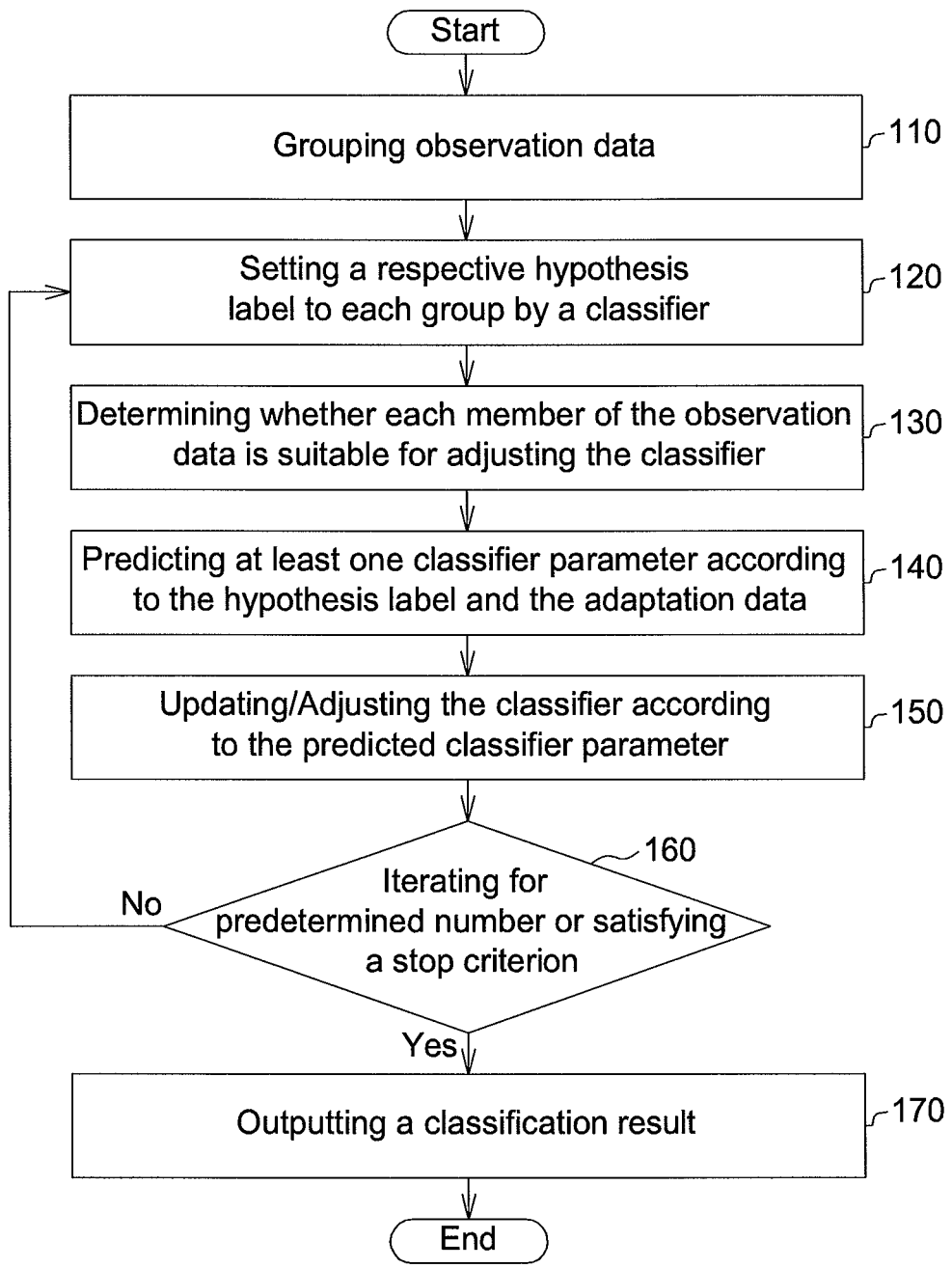
FIG. 1 is a flowchart of an unsupervised adaptation method for computerized visual classification according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An unsupervised adaptation method and an automatic image classification method applying the same are provided. Object image classification parameters are updated according to non-manually-labeled image data to be searched, for enhancing adaptation capability for different scenes and lighting changes.

In a continuous image sequence (e.g., multiple consecutive images containing the same moving object captured by a road video camera), a same moving object may appear at different positions in the consecutive images of the image sequence as the object is moving. Due to automatic white balance or brightness control, image characteristics of the object may have variations in the image sequence.

When the irregular image sequence is adopted as reference data for unsupervised adaptation to a new environment, assuming that the object in the image sequence can be prevented from being marked by different hypothesis labels (i.e., the same object in the image sequence is expected to be given the same hypothesis labels), reduced classification performance after the adaptation can also be avoided.

An unsupervised parameter adaptation method using object correlations and an automatic image classification method applying the same are provided by embodiments of the disclosure. A same hypothesis label is shared among a plurality of image data in a group having a close correlation to correctly set the hypothesis label for the purpose of adaptation.

In one embodiment, for example, the object correlation is identified according to object texture similarities, spatial location relationships and/or colors similarities to identify the same automobile from multiple consecutive images.

In one embodiment, a hypothesis label to be designated to a group of images is predicted according to a similarity score accumulated by an object probability model (which is related to multiple images) or a majority voting mechanism, so as to reduce influences imposed by irregular changes of sampling conditions.

In one embodiment, unreliable adaptation data are eliminated according to the prior probabilities of observation data. The unreliable adaptation data are excluded in updating the classifier parameter.

Figure 2A:
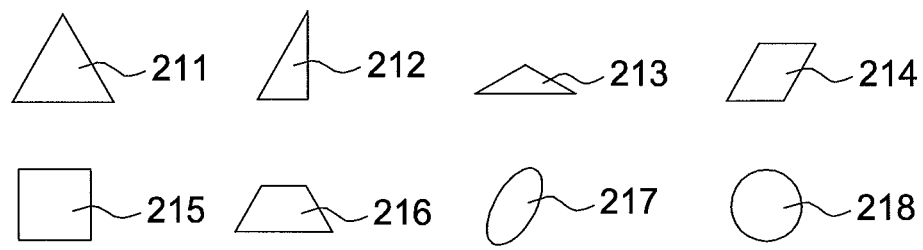
FIGS. 2A to 2C are schematic diagrams of an unsupervised adaptation method for computerized visual classification according to an embodiment.
Figure 2B:
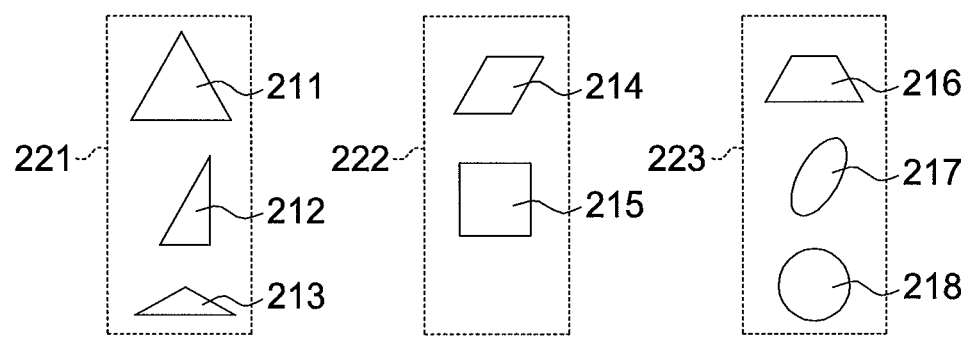
Figure 2C:
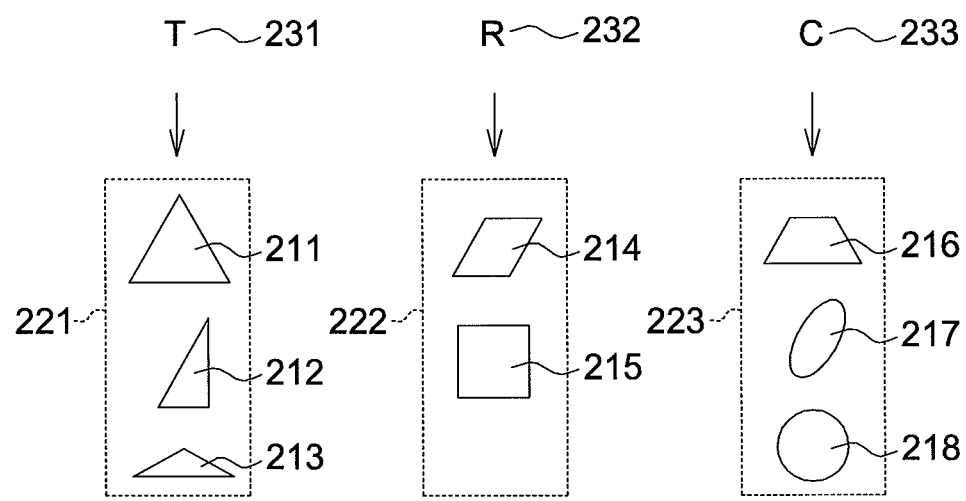

FIG. 1 shows a flowchart of an unsupervised adaptation method for computerized visual object classification according to one embodiment. FIGS. 2A to 2C are schematic diagrams of an unsupervised adaptation method for computerized visual object classification according to one embodiment. FIGS. 2A to 2C are for illustrating the embodiments. It should be noted that the disclosure is also applicable to other object classifications, e.g., object appearance classifications, object color classifications, vehicle classifications and pedestrian classifications.

Referring to FIG. 1, in step 110, observation data are grouped. In one embodiment, for example, the observation data may be grouped based on similarities in characteristics such as spatial locations relationships, texture similarities and/or colors similarities. After grouping, group results are in principle maintained the same.

While a hue of a same data group (e.g., consecutive images captured by a same video camera) may be altered due to slight changes in capturing conditions (e.g., effects of white balance or brightness control), texture characteristics of the appearance of an object remain the same. Therefore, a proper grouping result can be obtained based on the similarities of appearance texture and/or relationships of spatial locations.

For example, by observing a video captured by a road surveillance video camera, in a process from an object entering to exiting a capturing range, colors of the object may be noticeably changed due to reasons such as effects of white balance of the video camera or uneven lighting in the scene. Taking consecutive images captured from a red moving vehicle for example, as the vehicle occupies a majority area of the image frame due to the vehicle movement, the vehicle in the images may appear bluish as a result of an automatic white balance effect of the video camera. At this point, the red vehicle may be mistakenly classified as a blue vehicle by a general color classifier.

Taking FIG. 2A for example, observation data 211 to 218 have different patterns. These observation data may be grouped into several groups having different characteristics. As shown in FIG. 2B, for example, the observation data 211 to 218 are grouped into three groups 221 to 223. The observation data 211 to 213 are in the group 221, the observation data 214 and 215 are in the group 222, and the observation data 216 to 218 are in the group 223.

For observation data of a time series of images, the observation data may be grouped by an object association across images (i.e. the observation data are grouping by connection an object appearing in a time series of images). For example, consecutive images captured by a surveillance video camera are a time series of images. Thus, a same (moving) object in the consecutive images may be identified by the spatial location relationships and/or color/texture similarities. As such, the consecutive images containing the same (moving) object are grouped into the same group.

In color classification, grouping may still be performed according to object textures. However, errors are likely to occur when classifying solely based on textures. For example, assume that consecutive images contain multiple vehicles having the same appearance but different colors. When grouping solely based on object textures (i.e., outlines and contours of the vehicles), a final color classification result may group the vehicles having the same appearance but different colors to a same color classification group.

In step 120, the groups are respectively set with their own hypothesis label according to a classifier. The classifier is obtained in advance through a vast amount of training data. When setting the hypothesis label, each of the groups is set with a hypothesis label. That is, the observation data of the same group share the same hypothesis label. Taking FIG. 2B for example, the classifier sets the hypothesis labels 231-233 to the groups 221 to 223, respectively, as shown in FIG. 2C.

In step 130, verification is performed to determine whether each member of the observation data is suitable for adjusting the classifier. The verification procedure can be performed in various methods.

In one embodiment, two prior probabilities $Pr(o_i|Lebel_j)$ and $$\max_{k \neq j} Pr(o_i | Lebel_k)$$

are obtained. The prior probabilities $Pr(o_i|Lebel_j)$ represents the prior probability of the observation data $o_i$ according to a statistical model related to a label $Lebel_j$, and $$\max_{k \neq j} Pr(o_i | Lebel_k)$$

represents a maximum of the prior probabilities of the observation data $o_i$ according to statistical models related to other labels $\{Lebel_k\}(k \neq j)$.

For more detailed descriptions, taking FIG. 2C for example, $Pr(o_{211}|Lebel_{231})$ represents the prior probability of the observation data $o_{211}$ according to the statistical model related to the hypothesis label $Lebel_{231}$, and $$\max_{k \neq 231} Pr(o_{211} | Lebel_k)$$

represents the maximum of the prior probabilities of the observation data $o_{211}$ according to the statistical models related to the hypothesis labels $Lebel_{232}$ and $Lebel_{233}$, for example, $Pr(o_{211}|Lebel_{232})$.

A ratio $R_i$ of $Pr(o_i|Lebel_j)$ to $$\underset{k \neq j}{\text{Max}} Pr(o_i | Lebel_k)$$

is calculated as follows:

$$R_i = Pr(o_i | Lebel_j) / \underset{k \neq j}{\text{Max}} Pr(o_i | Lebel_k)$$

When the prior probability $Pr(o_i|Lebel_j)$ is smaller than a first threshold ($Pr(o_i|Lebel_j)<Thld\_1$), or when the ratio $R_i$ is smaller than a second threshold ($R_i<Thld\_2$), the observation data $o_i$ will be excluded from adjusting a classifier parameter. That is, the observation data $o_i$ is not used when adjusting the classifier parameter in subsequent steps. However, the observation data $o_i$ remains in the same group. Observation data that are utilized for adjusting the classifier parameter are referred to as adaptation data. The thresholds Thld_1 and Thld_2 are constants, and are predefined in a training phase of the classifier.

In another method for verification, it is determined whether a member of the observation data is excluded in adjusting classifier according to a distance measurement between the observation data and a representative member of the hypothesis label. When utilizing a distance measurement as a verification basis, a distance $Dist(o_i|Lebel_j)$ between the observation data $o_i$ and members of a representation set of the hypothesis label $Lebel_j$ is determined. Similarly, $$\underset{k \neq j}{\text{Max}} Dist(o_i | Lebel_k)$$

represents a minimum of the distances between the observation data $o_i$ and members of representation sets of other labels $\{Lebel_k\}(k \neq j)$.

When $Dist(o_i|Lebel_j)>ThldDist\_1$ or $DistR_i>ThldDist\_2$, the observation data $o_i$ is excluded in adjusting the classifier parameter. Wherein, $$DistR_i = Dist(o_i | Lebel_j) \Big/ \underset{k \neq j}{\text{Min}} Dist(o_i | Lebel_k).$$

Similarly, ThldDist_1 and ThldDist_2 are constants, which are predefined according to the distribution of distances between the training data and the members of the representation set of each label.

In step 130, the observation data which is unsuitable for adjusting the classifier parameter are excluded in the following step 140. Taking FIG. 2C for example, assuming that a circle hypothesis label is set to the group 223, the observation data 216 is likely excluded due to the quadrilateral shape of the observation data 216. The observation data that are not filtered out may be referred to as adaptation data for adjusting the classifier parameter.

In step 140, the classifier parameter is predicted according to the hypothesis label and the adaptation data, i.e., a new classifier parameter is predicted. In one embodiment, details for predicting the classifier parameters are not particularly limited.

In step 150, the classifier is updated or adjusted according to the newly predicted classifier parameter. As such, performance of the updated classifier may be enhanced.

In step 160, it is determined whether steps 120 to 150 are iterated for a predetermined number of times, or it is determined whether a stop criterion is satisfied. For example, it is considered that a stop condition is satisfied when the prior probabilities of all the adaptation data in step 120 satisfy a predetermined value.

The process returns to step 120 when a result in step 160 is negative. According to the updated classifier, the groups are again respectively set with a hypothesis label and the classifier parameter is again adjusted to satisfy a predetermined optimal criterion. The process proceeds to step 170 when the result in step 160 is affirmative to output a classification result.

In one embodiment, for example, the object classifier may be a Gaussian mixture models (GMMs) based classifier, which includes mixture weight values of Gaussian functions as well as mean vectors and covariance matrices of the observed features of object. These parameters of GMMs can be obtained through an expectation maximization (EM) algorithm at a model training phase. The adaptation of new test condition of GMMs parameters can be achieved by adjusting the mean vectors with additional biases according to a maximum likelihood linear regression (MLLR) algorithm.

In conclusion, the unsupervised adaptation method, disclosed in the embodiments, connects a plurality of observation data into at least one group (the observation data of the same group share a same unknown label), and a hypothesis label is designated to each of the groups by a classifier. It is determined whether each member of the observation data of each of the groups is suitable for adjusting a classifier parameter. Based on the hypothesis label, the adjustment parameter of the classifier is predicted and the classifier parameter is adjusted accordingly. The above steps are iterated until an iteration number reaches a predetermined number or when a stop criterion is satisfied.

An automatic image classification method applying the above embodiments is provided in another embodiment. The automatic image classification method includes: grouping a plurality of non-manually-labeled observation data into a plurality of groups; setting respective hypothesis label to each of the groups according to a classifier; determining whether each element of the non-manually-labeled observation data is suitable for adjusting the classifier according to the hypothesis label, and setting the suitable elements of non-manually-labeled observation data for adjusting the classifier as a plurality of adaptation data; updating the classifier according to the hypothesis label and the adaptation data; and classifying the observation data according to the updated classifier. Details of the steps of the automatic image classification method can be referred from descriptions associated with the foregoing embodiments, and shall be omitted herein.

The above methods of the embodiments may be implemented by hardware (e.g., a processor), or a programmable integrated circuit such as a microcontroller, a field array programmable gate array (FPGA) circuit.

Further, the above methods of the embodiments may also be implemented by software. The software may be recorded in a recording medium (e.g., a memory, a ROM, a RAM, an optic or magnetic recording medium, or other types of recording media). The above methods of the embodiments may also be implemented through firmware. Alternatively, the above methods of the embodiments may be implemented by combination of software and hardware.

With the embodiments, it is demonstrated that a classifier parameter is updated according to non-manually-labeled image data to be searched, to adapt to different scenes or different lighting condition changes. Therefore, with the embodiments, costs for manually labeling new scene data may be eliminated while also enhancing performance of automated retrieval and classification of a large video database.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An unsupervised adaptation method applied to an electronic device, comprising:
   implementing a processor to perform the following steps;
   grouping a plurality of non-manually-labeled observation data into a plurality of groups;
   setting a respective hypothesis label to each of the groups according to a classifier;
   obtaining a shortest distance between each member of the observation data of each of the groups and a plurality of the members of the sample set of the hypothesis label, and obtaining a minimum of a plurality of distances between the member of the observation data and a plurality of members of representation sets of other hypothesis labels;
   determining whether each member of the observation data in the groups is suitable for adjusting the classifier according to a ratio of a shortest distance between the observation data and the hypothesis label to a minimum of a plurality of distances between the observation data and other hypothesis labels, and setting the observation data which are determined as being suitable for adjusting the classifier as a plurality of adaptation data;
   predicting at least one adjustment parameter of the classifier according to the hypothesis labels and the adaptation data, to adjust the classifier; and
   iterating the above steps to adjust the classifier.

2. The unsupervised adaptation method according to claim 1, wherein the grouping step comprises:
   grouping the non-manually-labeled observation data according to spatial location relationships, texture similarities, and/or color similarities of the observation data;
   wherein, the groups are maintained after the grouping step.

3. The unsupervised adaptation method according to claim 1, wherein the grouping step comprises:
   grouping the observation data by connecting an object appearing in a time series of images.

4. The unsupervised adaptation method according to claim 1, wherein the observation data of the same group share an unknown label.

5. The unsupervised adaptation method according to claim 1, wherein the classifier is obtained in advance by utilizing training data.

6. The unsupervised adaptation method according to claim 1, wherein the step of determining whether each member of the observation data is suitable for adjusting the classifier comprises:
   determining whether the member of the observation data is suitable for adjusting the classifier according to a distance measurement between the observation data and members of a representation set of the hypothesis labels.

7. The unsupervised adaptation method according to claim 6, wherein the step of determining whether each member of the observation data is suitable for adjusting the classifier comprises:
   obtaining a shortest distance between each member of the observation data of each of the groups and a plurality of the members of the representation set of the hypothesis label; and
   determining whether the shortest distance is greater than a first distance threshold, and excluding the member of the observation data from adjusting the classifier if yes, or else including the member of the observation data for adjusting the classifier.

8. The unsupervised adaptation method according to claim 6, wherein the step of determining whether each member of the observation data is suitable for adjusting the classifier comprises:
   determining whether a ratio of the shortest distance between the member of the observation data and the hypothesis label to the minimum of the distances between the member of observation data and other hypothesis labels is smaller than a second distance threshold, and excluding the member of the observation data from adjusting the classifier if yes, or else including the member of the observation data for adjusting the classifier.

9. The unsupervised adaptation method according to claim 1, further comprising:
   determining whether the above steps are iterated for a predetermined number or whether a stop criterion is satisfied to determine whether to stop iterating the adjusting step.

10. An automatic image classification method applied to an electronic device, comprising:
    implementing a processor to perform the following steps;
    grouping a plurality of non-manually-labeled observation data into a plurality of groups; setting a respective hypothesis label to each of the groups according to a classifier;
    obtaining a shortest distance between each member of the observation data of each of the groups and a plurality of the members of the sample set of the hypothesis label, and obtaining a minimum of a plurality of distances between the member of the observation; determining whether each member of the observation data of the groups is suitable for adjusting the classifier according to a ratio of a shortest distance between the observation data and the hypothesis label to a minimum of a plurality of distances between the observation data and other hypothesis labels and setting the observation data which are determined as being suitable for adjusting the classifier as a plurality of adaptation data;
    updating the classifier according to the hypothesis label and the adaptation data; and classifying the observation data according to the updated classifier.

11. The automatic image classification method according to claim 10, wherein the grouping step comprises:
    grouping the non-manually-labeled observation data according to spatial location relationships, texture similarities, and/or color similarities of the observation data;
    wherein, the groups are maintained after the grouping step.

12. The automatic image classification method according to claim 10, wherein the grouping step comprises:
    grouping the observation data by connecting an object appearing in a time series of images.

13. The automatic image classification method according to claim 10, wherein the observation data of the same group share an unknown label.

14. The automatic image classification method according to claim 10, wherein the classifier is obtained in advance by utilizing training data.

15. The automatic image classification method according to claim 10, wherein the step of determining whether each member of the observation data is suitable for adjusting the classifier comprises:
   determining whether the observation data are suitable for adjusting the classifier according to a distance measurement between the member of the observation data and members of a representation set of the hypothesis labels.

* * * * *